United States Patent [19]
Nagai et al.

[11] Patent Number: 5,501,530
[45] Date of Patent: Mar. 26, 1996

[54] DOUBLE-ROW BALL BEARING OF ANGULAR TYPE FOR WHEEL

[75] Inventors: Kenichi Nagai; Hiroya Miyazaki; Naoki Mitsue, all of Fujisawa, Japan

[73] Assignee: NSK Ltd., Tokyo, Japan

[21] Appl. No.: 356,078

[22] Filed: Dec. 14, 1994

[30] Foreign Application Priority Data

Dec. 15, 1993 [JP] Japan ................................. 5-315301

[51] Int. Cl.$^6$ ........................................ F16C 33/58
[52] U.S. Cl. ............................................... 384/516
[58] Field of Search ................................. 384/504, 513, 384/516

[56] References Cited

U.S. PATENT DOCUMENTS 2,142,478  1/1939  Murden ................................. 384/516
3,370,899  2/1968  Eklund ................................. 384/516
4,411,479  10/1983  Hirata et al. ........................ 384/504
5,051,004  9/1991  Takeuchi et al. ................... 384/516

FOREIGN PATENT DOCUMENTS 64-30924  2/1989  Japan.

Primary Examiner—Thomas R. Hannon
Attorney, Agent, or Firm—Helfgott & Karas

[57] ABSTRACT

A double-row, angular-type ball bearing for a wheel has a groove radius relationship such that the groove radius r6a of the outer-ring raceway 6a on the widthwise outer side with reference to the vehicle is larger than the groove radius r6b of the outer-ring raceway 6b on the widthwise inner side with reference to the vehicle (r6a>r6b), and has a shoulder section formed in the first outer-ring raceway 6a on the outer side and the second outer-ring raceway 6b on the inner side to have a sub-section 10 that curves in the opposite direction with reference to the main section 9 of the outer-ring raceways 6a, 6b.

1 Claim, 6 Drawing Sheets

DOUBLE-ROW BALL BEARING OF ANGULAR TYPE FOR WHEEL

FIELD OF THE INVENTION

The present invention is related to a double-row, ball bearing of the angular-contact-type for use in supporting a wheel to the suspension apparatus of an automobile so that the wheel rotates freely.

RELATED ART OF THE INVENTION

A double-row, ball bearing of the angular-contact-type has previously been used to support a wheel with respect to an automobile suspension apparatus so that the wheel rotates freely, such as was disclosed in Japanese Patent First Publications KOKAI Nos. 64-30924 and 3-96717 and U.S. Pat. No. 5,051,004. This double-row, angular-type ball bearing for a wheel, for example as shown in FIG. 1, comprises an inner ring 1 and outer ring 2, which are placed concentric with each other, and a plurality of balls 3 which are rotatably located between the inner ring 1 and the outer ring 2. The inner ring 1 comprises a pair of inner-ring elements 4 having axial ends faced to each other, and the inner-ring raceways 5 are formed around the outside surface of these inner-ring elements 4. Moreover, the outer-ring raceways 6, which are formed around the inside surface of the outer ring 2, are faced to these inner-ring raceways 5. Disposed between these inner-ring raceways 5 and outer-ring raceways 6 are the balls 3 that are rotatably held by retainers 7. A flange 8 is formed around the outside surface of the outer ring 2 for securing the bearing to a wheel (not shown in the drawing).

The multiple balls 3 are held between the inner-ring raceways 5 and outer-ring raceways 6 so that they have a prescribed angle of contact with reference to the inner-ring raceways 5 and outer-ring raceways 6. Accordingly, the double-row, angular-type ball bearing for a wheel as shown in FIG. 1, is capable of supporting a load in the axial direction as well as a load in the radial direction.

In the double-row, angular-type ball bearing for a wheel as described above, in order that the relative rotation of the inner ring 1 with respect to the outer ring 2 is smooth and not shaky, the multiple balls are pressed between the inner-ring raceways 5 and the outer-ring raceways 6, which is referred to as an initial preloading. For example, in order to perform the initial preloading for the construction shown in FIG. 1, the inner-ring elements 4 of the inner ring 1 are fitted around the wheel axle (not shown in the figure) by a interference fit, so that the outer diameter of the inner-ring raceways 5 is expanded, and that any shaking or rattling in the axial direction of the double-row, angular-type ball bearing is reduced. Furthermore, by tightening a nut (not shown) around the end of the wheel axle, the inner-ring elements 4 are pressed to each other in the axial direction so as to remove the shaking or rattling in the axial direction, resulting in that the initial preloading is performed.

It is also possible to construct the bearing so that there is a clearance fit relationship between the inner ring and the wheel axle. With that kind of construction, the initial preloading can be performed only by tightening the nut on the end of the wheel axle.

In order to obtain the best performance over a long time of the double-row, angular-type ball bearing for a wheel described above, it is necessary that the balls 3 be preloaded as described and that this preloading be kept within a reasonable range. Previously, in order to do this, the inner diameter of the inner-ring elements 4, and the outer diameter of the wheel axle were specified to a desired value, or when fitting these inner-ring elements 4 around the wheel axle, the amount to press the inner-ring elements 4 was adjusted, so that the preloading was kept within a reasonable range.

If the preloading is inadequate, shaking or rattling occurres as the inner ring 1 turned with respect to the outer ring 2, and the straight ahead stability of the vehicle having the double-row, angular-type ball bearing installed in it becomes poor. Also, the range of loading, that is the number of balls supporting the load, in the ball bearing is reduced due to the moment load that is caused by the centrifugal force when the vehicle is turning, so that excessive loads are applied to a single ball, resulting in that the life of the ball bearing is shortened.

On the other hand, if the preloading was too large, the torque required to turn the double-row, angular-type ball bearing is increased, and this causes the fuel efficiency of the vehicle using the ball bearing to become poor. Moreover, due to the moment load, it is easy for the balls 3 to move up into the shoulder section of the raceways 5, 6. When the balls 3 move up into the shoulder section, the rolling surfaces of the balls 3 are easily damaged, thus shortening the life of the ball bearing. Furthermore, as the contact pressure between the rolling surface of the multiple balls 3 and the inner-ring raceway 5 and outer-ring raceway 6 increases, the rolling fatigue life of the ball bearing is shortened.

In the case of the prior double-row, angular-type ball bearing for a wheel constructed as described above, there are not only large changes in the preloading due to differences in dimensions of all of the components, but there are also large changes in the preloading that accompanies use of the bearing.

For example, in the double-row, angular-type ball bearing for a wheel shown in FIG. 1, the initial preloading changes due to the difference between the inner diameter of the inner-ring elements 4 of the inner ring 1 and the outer diameter of the wheel axle around which the inner-ring element 4 are fitted in the interference fit relationship. Therefore, in the prior art ball bearing, these parts have to be manufactured so that their inner diameter and outer diameter are kept within prescribed dimensions. However, due to unavoidable errors that occur during manufacturing, it is impossible to avoid small variations in the dimensions of the parts, and therefore in the difference between the inner diameter of the inner-ring element 4 and the outer diameter of the wheel axle. Therefore variation in the parts that affects the preloading leads to variation in the value of the initial preloading of the double-row, angular-type ball bearing, and it is impossible to avoid variation in the performance of the vehicle in which the bearing is installed.

Furthermore, when the double-row, angular-type ball bearing for a wheel is in use, a moment load occurs, for example, when the vehicle makes a sudden turn, and the portion or component of this moment load that is in the axial direction often causes displacement in the axial direction of the component parts of the ball bearing. In order to maintain the durability of the double-row, angular-type ball bearing for a wheel, it is desirable that the amount of change of the preloading with respect to the displacement is small. For example, in the construction of the prior bearing shown in FIG. 1, it is desirable that the amount of change of the preloading is kept small even when there are small changes in the distance between the end faces of the pair of inner-ring elements 4.

Therefore, in the prior art ball bearing, in order to keep the amount of change in the preloading small, in other words to make the preloading range smaller when the bearing is in use, with respect to the displacement of the bearing which is caused by errors in dimensions of the component parts or by the moment load that is applied to the bearing when in use, the groove radius of the inner-ring raceway 5 or outer-ring raceway 6, that is the radius of curvature of the cross section obtained by cutting the raceways 5 and 6 with a plane that passes through the center axis of inner ring 1 and outer ring 2, is made large in comparison to the outer diameter of the balls 3.

However, by making the groove radius larger in this way, the area of the contact ellipse, which is the portion of contact between the surface of the raceway and the rolling surface of the balls, becomes smaller, so that large surface pressure occurs in the portion of contact. As a result, the rolling fatigue life of the ball bearing is shortened in the same way as when the preloading is too large.

SUMMARY OF THE INVENTION

The double-row, angular-type ball bearing for a wheel of this invention takes into consideration the above conditions.

An objective of the present invention is to provide a double-row, angular-type ball bearing for a wheel, wherein the groove radius of the outer-ring raceway on the widthwise outer side with reference to the vehicle is larger than the groove radius of the outer-ring raceway on the widthwise inner side with reference to the vehicle, and the outer-ring raceway on the widthwise outer side and the outer-ring raceway on the widthwise inner side have a shoulder section which has a sub-section that curves in the opposite direction with reference to the main section of the outer-ring raceways.

DESCRIPTION OF THE PREFERRED EMBODIMENTS

Figure 1:
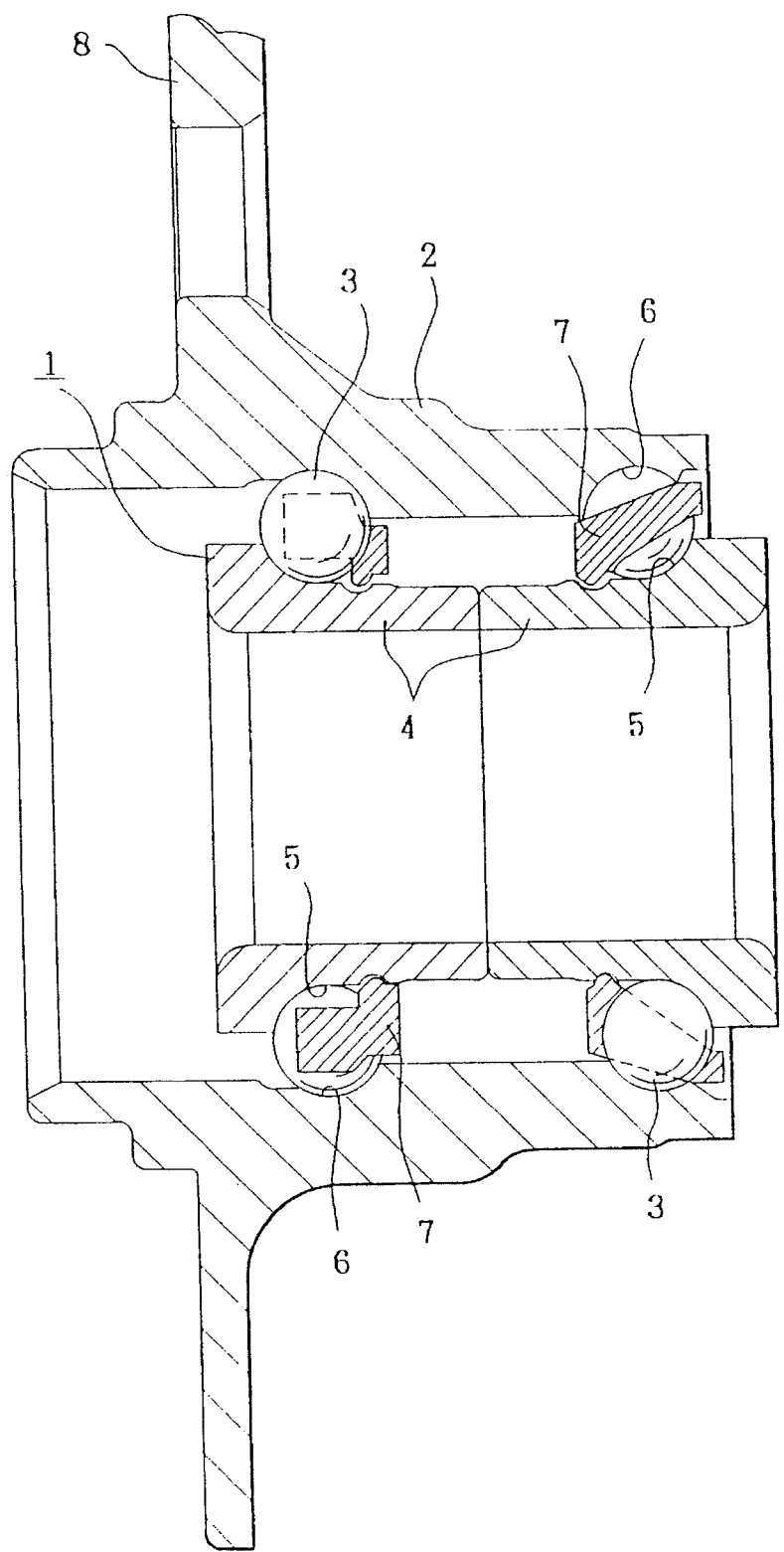
FIG. 1 is a cross-sectional view of one example of the double-row, angular-type ball bearing for a wheel to which this invention is applied.

As shown in FIG. 2 (A), the double-row, angular-type ball bearing for a wheel of this invention comprises an inner ring or race 1, which has two inner-ring raceways 5a and 5b formed around its outside surface, an outer ring or race 2, which has two outer-ring raceways 6a and 6b formed around its inside surface, and a plurality of balls 3 located rotatably between the inner-ring raceways 5a, 5b, and outer raceways 6a, 6b. The balls 3 have the same outer diameter. Either of the inner ring or race 1 and outer ring or race 2 is adapted to be supported by the suspension apparatus, and the other of the inner ring or race 1 and the outer ring or race 2 is adapted to support the wheel.

Furthermore, the double-row, angular-type ball bearing for a wheel of this invention simultaneously satisfies the following conditions (A) thru (C).

(A) When installing the bearing to the suspension apparatus, provided that the side of the bearing facing toward the widthwise outside of the vehicle is taken to be the first or outerside, and in the same way the side of the bearing facing toward the widthwise inside of the vehicle is taken to be the second or inner side, then at least one of the following conditions, (a) and (b), must be satisfied.

(a) The first groove radius r5a of the first inner-ring raceway 5a on the outer side is larger than the second groove radius r5b of the second inner-ring raceway 5b on the inner side (r5a> r5b).

(b) The third groove radius r6a of the first outer-ring raceway 6a on the outer side is larger than the fourth groove radius r6b of the second outer-ring raceway 6b on the inner side (r6a>r6b).

(B) Provided that the outside diameter of the balls 3 is taken to be d, then the second groove radius r5b of the second inner-ring raceway 5b on the inner side is 0.51d to 0.53d, the first groove radius r5a of the first inner-ring raceway 5a on the outer side is 0.51d to 0.56d, the fourth groove radius r6b of the second outer-ring raceway 6b on the inner side is 0.515d to 0.545d, and the third groove radius r6a of the first outer-ring raceway 6a on the outer side is 0.53d to 0.565d.

(C) The first groove radius r5a of the first inner-ring raceway 5a on the outer side is not less than the second groove radius r5b of the second inner-ring raceway 5b on the inner side, and the third groove radius r6a of the first outer-ring raceway 6a on the outer side is not less than the fourth groove radius r6b of the second outer-ring raceway 6b on the inner side.

In order to make this more clear, the restriction conditions of this invention, (A) thru (C), are listed below:

$r5a>r5b$ . . . (1)
$r6a>r6b$ . . . (2)
(Condition (1) or condition (2) or both must be satisfied.)
$r5b=0.51d$ to $0.53d$
$r5a=0.51d$ to $0.56d$
(It is even better if r5a is between 0.53d and 0.56d.)
$r6b=0.515d$ to $0.545d$
$r6a=0.53d$ to $0.565d$
(It is even better if r6a is between 0.535d and 0.565d.)
$r5a \geq r5b$ . . . (3)
$r6a \geq r6b$ . . . (4)
(Both condition (3) and (4) must be satisfied at the same time.)

In the double-row, angular-type ball bearing for wheel of this invention, constructed as described above, at least one of the groove radius r5a of the inner-ring raceway 5a and the groove radius r6a of the outer-ring raceway 6a on the outer side is sufficiently larger than the radius, d/2, of the balls. Therefore it is possible to keep small the amount of change of the preloading with respect to the bearing displacement.

Figure 2A:
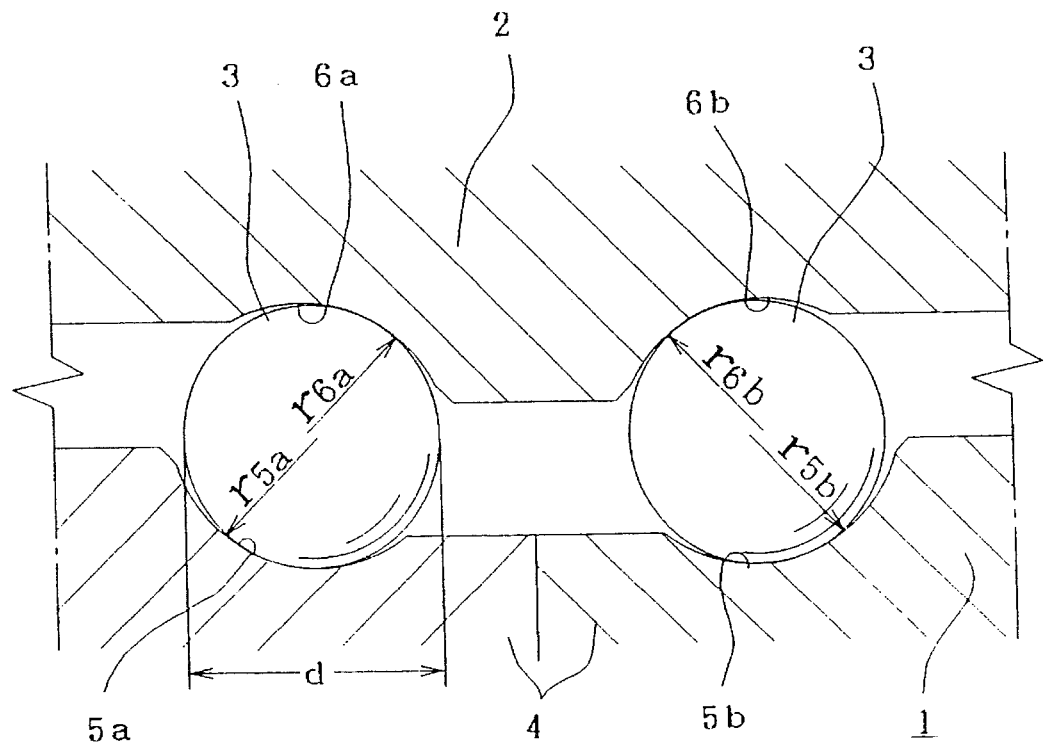
FIG. 2(A) is a cross-sectional view showing the main portion of the double-row, angular-type ball bearing for a wheel in which this invention is incorporated.
Figure 2B:
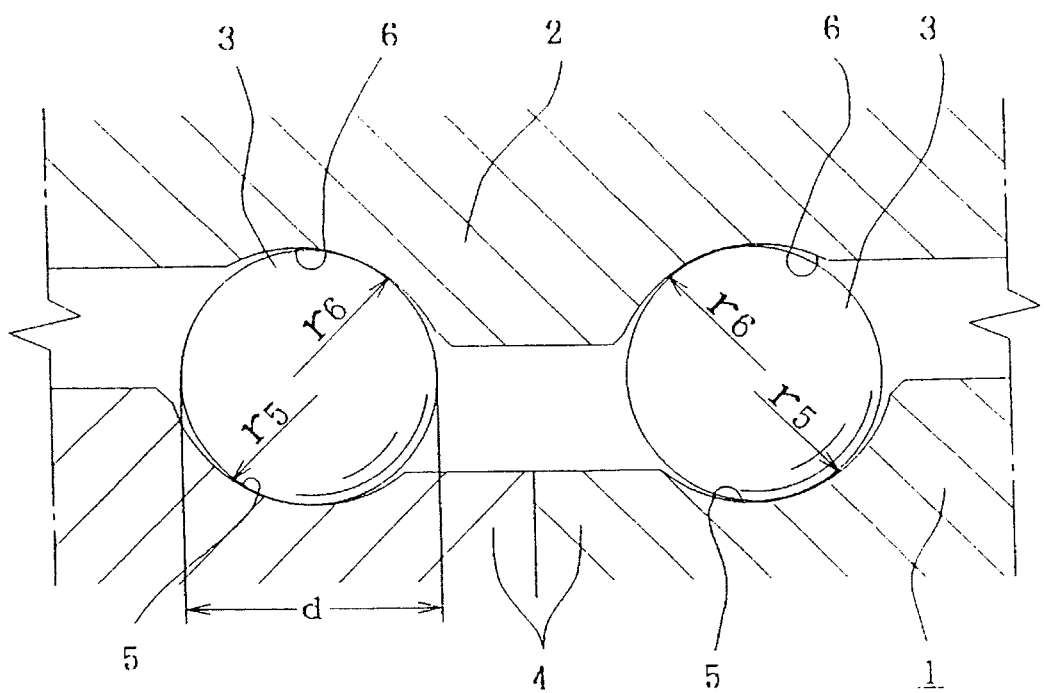
FIG. 2(B) is a similar view to FIG. 2 (A) for a prior art bearing.
Figure 3:
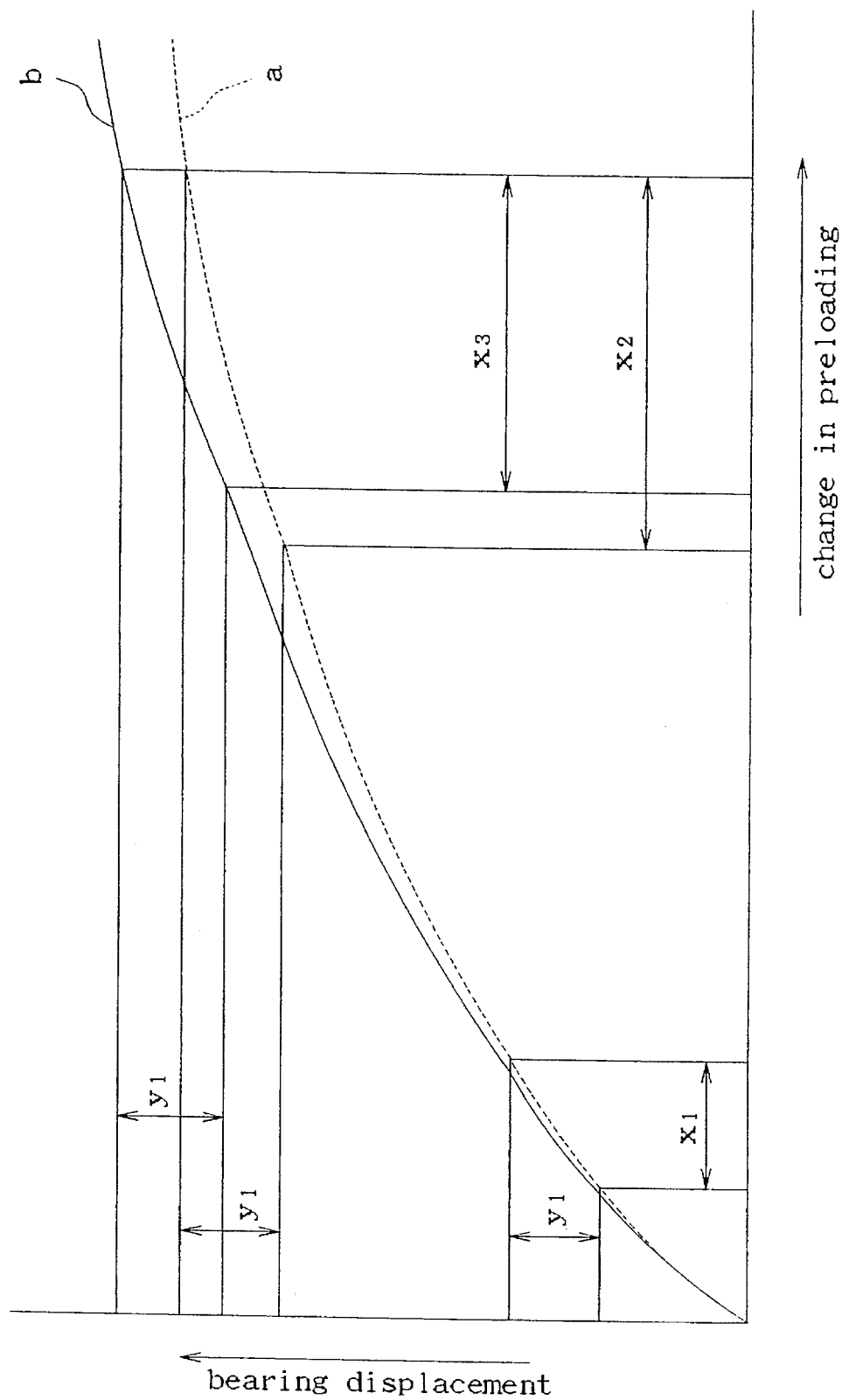
FIG. 3 is a graph showing the amount of change of preloading with respect to bearing displacement.

In other words, as shown in FIG. 2(B), in the construction of a prior art bearing, where both of the inner-ring raceways 5 have the same groove radius r5 and both of the outer-ring raceways 6 have the same groove radius r6, the bearing displacement that occurs due to dimension errors of the components or assembly errors, or due to the part or component of the moment load that acts in the axial direction, causes the preloading to change as shown by the dotted line "a" in FIG. 3.

Now, in the construction of this invention shown in FIG. 2 (A), the preloading changes corresponding to the bearing displacement as shown by the solid line "b" in FIG. 3.

For example, if the bearing displacement is y1, and the absolute value of the bearing displacement is small, the amount x1 of change of the preloading is nearly the same for either construction of the prior art bearing and the present invention. However, if the absolute value of the bearing displacement is large, the amount x3 of change of the preloading for the construction of this invention is smaller than the amount x2 of change of preloading of the prior construction for the same bearing displacement y1. Moreover, changes in the preloading is also small when there is bearing displacement caused by dimension errors of components or assembly errors, or caused by changes in the moment load.

Furthermore, because the groove radii r5b, r6b of the inner-ring raceway 5b and outer-ring raceway 6b on the inner side are closer to the radius d/2 of the balls 3 than the groove radii r5a, r6a of the inner-ring raceway 5a and outer-ring raceway 6a on the outer side, the surface area of the contact ellipse of the balls 3 with the inner-ring raceway 5b and outer-ring raceway 6b on the inner side becomes larger. As a result, the surface pressure acting on the contact section becomes smaller, so that it is possible to better maintain the rolling fatigue life in this section.

By making at least one of the groove radius r5a of the inner-ring raceway 5a and the groove radius r6a of the outer-ring raceway 6a of the outer side larger than the groove radii of the raceways on the inner side, the surface area of the contact ellipse between the raceways 5a, 6a and the rolling surfaces of the balls 3 becomes smaller. Furthermore, the surface pressure acting on the raceways 5a, 6a and the rolling surfaces of the balls 3 becomes large, and the rolling fatigue life of the area of contact is shortened.

On the other hand, with the double-row, angular-type ball bearing for a wheel to which this invention is applied, the load applied to the inner side is larger than the load applied to the outer side.

Accordingly, in the case of the prior art construction shown in FIG. 2 (B), the life of the components of the double-row, angular-type ball bearing on the outer side is somewhat longer than those on the inner side due to this difference in load.

In the case of the double-row, angular-type ball bearing for a wheel of this invention, since the groove radii r5a, r5b, r6a, r6b of the inner-ring raceways 5a, 5b and the outer-ring raceways 6a, 6b on the outer and inner sides adequately satisfy the conditions (A) thru (C) described above, then it is possible to make the life of the components on the inner side and outer side substantially the same.

By making the life of all of the components on the inner and outer sides substantially the same, it is possible to maintain the life of the entire angular-type ball bearing, as well as keep the amount that the preloading changes with respect to the bearing displacement small.

As a result, it is possible to improve the durability of a double-row, angular-type ball bearing for a wheel even though the precision of the component dimensions and the precision by which they are assembled stays substantially the same as in prior bearings, and it is possible to improve the durability of the double-row, angular-type ball bearing for a wheel when the bearing is being used in conditions where a moment load is applied.

Figure 4:
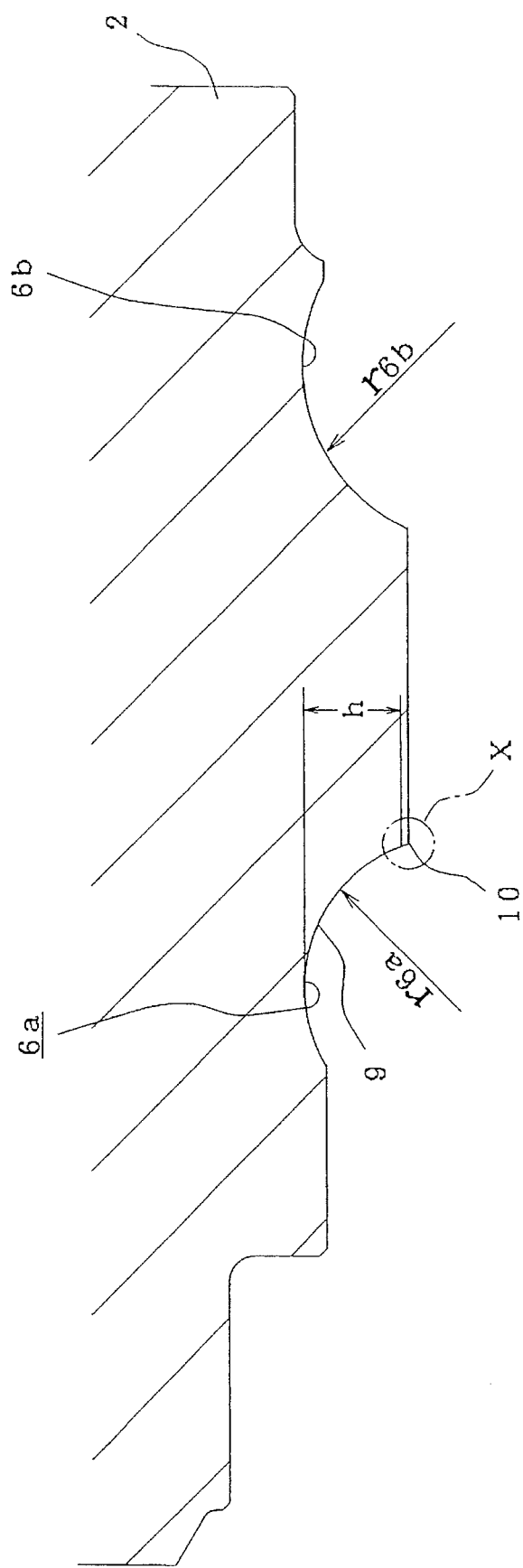
FIG. 4 is a partial cross-sectional view of the outer ring to show an embodiment of this invention.
Figure 5:
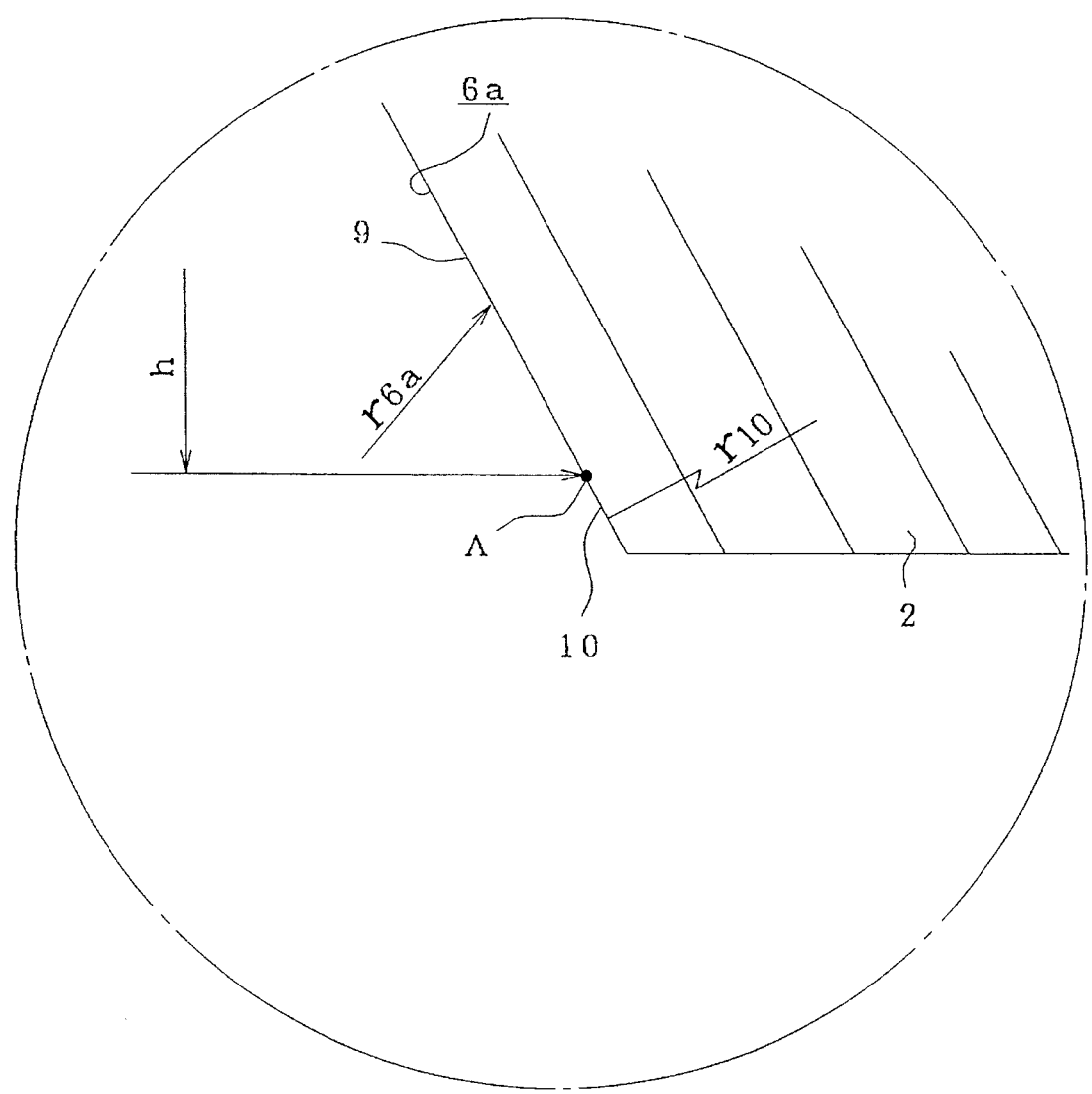
FIG. 5 is an enlarged cross-sectional view of X of FIG. 4.
Figure 6:
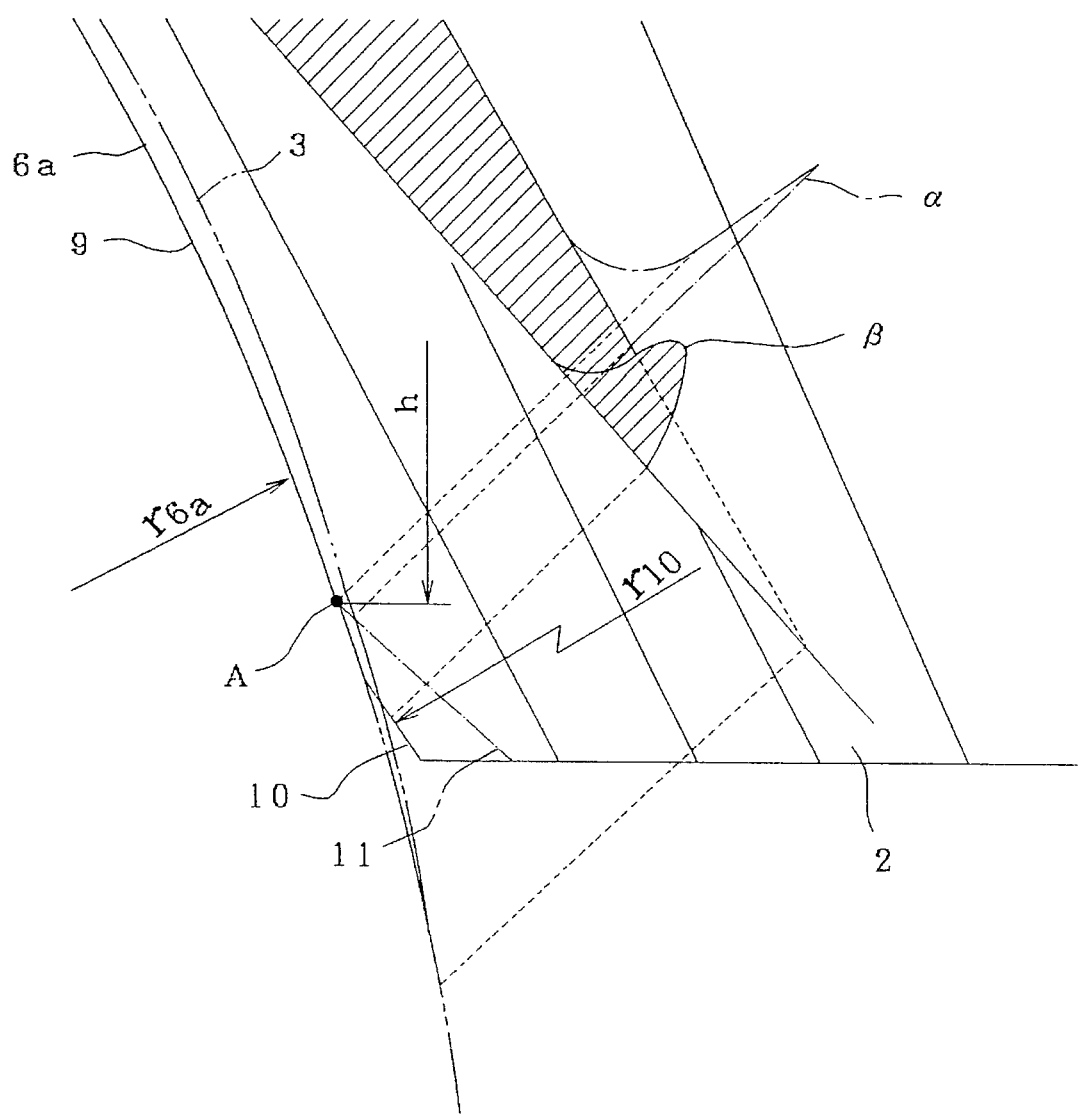
FIG. 6 is an enlarged cross-sectional view of X of FIG. 4 to show the distribution of surface pressure in the part shown in FIG. 5, when the ball has moved up in the outer-ring raceway.

FIGS. 4 thru 6 show an embodiment of this invention. It will be noted that the cross-section of the two outer-ring raceways 6a, 6b formed on the inside surface of the outer ring 2 is processed corresponding to this invention. The groove radii r6a, r6b of the outer-ring raceways 6a, 6b are processed such that the groove radius r6a of the outer-ring raceway 6a on the outer side is larger than the groove radius r6b of the outer-ring raceway 6b on the inner side (r6a>r6b).

Provided that the diameter of the balls 3, whose rolling surfaces come in contact with the outer-ring raceways 6a, 6b, is taken to be d (see FIGS. 1 and 2(A) and 2(B)), then the groove radius r6b of the outer-ring raceway 6b on the inner side is 0.515d to 0.545d, and the groove radius r6a of the outer-ring raceway 6a on the outer side is 0.535d to 0.565d.

By restricting the groove radius r6b of the outer-ring raceway 6b on the inner side and the groove radius r6a of the outer-ring raceway 6a on the outer side as described above, it is possible, as mentioned above, to improve the durability of the double-row, angular-type ball bearing for a wheel when it is used under conditions of a moment load.

Furthermore, in this embodiment of the invention, in both of the outer-ring raceway 6a on the outer side and the outer-ring raceway 6b on the inner side, the shoulder section has a sub-section 10 that curves in the opposite direction with reference to the main section 9 of the outer-ring raceways 6a, 6b. In the example shown in the figure, the sub-section 10 is shown only in the portion of the outer-ring raceway 6a on the outer side.

In other words, the main section 9 of the outer-ring raceway 6a on the outer side has a radius of curvature r6a that is 0.535d to 0.565d, as mentioned above, and curves in a direction such that the inside surface of the outer-ring raceway 6a is concave, while the sub-section 10 has a radius r10 of curvature and curves in a direction so that the inside surface of the outer-ring raceway 6a is convex. The main section 9 and sub-section 10 are smooth and continuous at the inflection point A which is located at a distance h from the lowest point or groove bottom of the outer-ring raceway 6a.

It is desirable that the distance h from the bottom of the groove to the point of inflection A is 0.3 times or more that of the outer diameter d of the balls 3 (h≧0.3d). The reason for this is that by maintaining sufficiently the dimension h, which is also the height of the main section 9, the rolling surface of the balls 3 will not leave the main section 9, in other words, the rolling surface does not come in contact with the sub-section 10 even if a moment load is more or less applied to the double-row, angular-type ball bearing for a wheel.

Also, it is desirable that the radius r10 of curvature of the sub-section 10 is 0.1 to 0.5 times the outer diameter d of the balls 3 (r10=0.1d to 0.5d). In other words, when a large moment load is applied to the double-row, angular-type ball bearing for a wheel due to a sudden change in the course of the vehicle, the balls 3 move up into the shoulder section of the outer-ring raceway 6a, and the rolling surface of these balls 3 moves away from the main section 9 and comes in contact with the sub-section 10. Even when this does happen, the radius r10 of curvature is restricted as described above in order to prevent large surface pressure from acting on the area of contact.

When the radius r10 of curvature exceeds 0.5d, it becomes easier for the balls 3 to move up into the shoulder section. Also, when the balls 3 move up into the shoulder section, the shoulder section and the balls are elastically deformed, so that the contact pressure in the area of contact becomes excessive, making it easy for damage such as flaking to occur.

On the other hand, if the radius r10 of curvature is less than 0.1d, the surface area of the contact ellipse between the balls 3 and the sub-section 10 becomes small, and again the contact pressure in the area of contact becomes excessive, making it easy for damage such as flaking to occur. Therefore, it is desirable that the radius r10 of curvature be in the range of 0.1d to 0.5d.

By forming a sub-section 10 in the shoulder section of the outer-ring raceway 6a on the outer side as described above, it is possible to prevent damage that occurs when a moment load is applied. In other words, in the case of the outer ring 2 shown in FIG. 4, the groove radius r6a of the outer-ring raceway 6a on the outer side is made large, so that when the this outer ring 2 is assembled in a double-row, angular-type ball bearing for a wheel, it is difficult for the balls 3 to move up into the shoulder section of the outer-ring raceway 6a on the outer side when a large moment load is applied, and conversely, it becomes easy for the balls 3 to move up into the shoulder section of the outer-ring raceway 6b on the inner side when a large moment load is applied.

In the case of a typical prior art ball bearing, only a planar bevel 11 is used in the shoulder section as shown by the single-dot line in FIG. 6. Therefore, when the ball 3 moves up into shoulder to the position shown by the two-dot line of the same figure, partial peak in the surface pressure occurres in the area of contact between the outer ring 2 and the ball 3 having a distribution as shown by the one-dot line "α". In other words, large surface pressure occurs at the continuous transition point of the bevel 11 in the shoulder section and the outer-ring raceway 6a. As a result, the ball 3 is damaged in the area of contact, and it becomes easy for early-stage flaking to occur.

In regards to this, if a sub-section 10, which satisfies the conditions described above, is formed at least in the shoulder section of outer-ring raceway 6b on the inner side, in the figures, in both the outer-ring raceways 6a, 6b on the outer and inner sides, as well as in both the inner-ring raceways 5a, 5b on the outer and inner sides, when the ball 3 moves up into the shoulder section to the position shown by the two-dot line in FIG. 6, surface pressure occurring in the area of contact has a distribution as shown by the solid line "β" in the same figure.

It can be clearly seen by comparing this solid line "β" with the one-dot line "α", that by forming a sub-section 10, it is possible to lower the surface pressure that occurs when the ball moves up into the shoulder. As a result, it is more difficult for the ball to be damaged in the area of contact, and it is also more difficult for damage due to early-stage flaking to occur.

The Japanese Patent First Publication KOKAI No. 3-96717, describes a technique of improving the distribution of surface pressure when the ball moves up into the shoulder section of the outer-ring raceway. Specifically, a sub-section is formed to bend in the opposite direction with reference to the main section in the shoulder section of the outer-ring raceway as shown in FIGS. 4 to 6. However, in the case of the technique described this disclosure, the radius of curvature of the sub-section is larger than the radius of curvature of the main section, and is desirably five times or more than the radius of curvature of the main section. When the radius of curvature of the sub-section is made large like this, the starting point of the sub-section is closer to the main section side, and it is easy for the balls to move up into the shoulder section. When the balls move up into the sub-section, the elastic deformation of the shoulder section and balls increases, and contact pressure in the area of contact becomes excessive, making it easier for the balls to become damaged, and easier for damage such as early-stage flaking to occur in the area of contact, as was mentioned above.

As was mentioned above, the double-row, angular-type ball bearing for a wheel of this invention makes it possible to keep small the amount that the preloading changes with respect to the bearing displacement, and to keep small the change in size of the surface area on the contact ellipse between the surface of the raceways and the rolling surface of the balls, regardless of errors in the dimensions of the components or assembly errors, or displacement of component parts due to a moment load. As a result, the contact pressure between the surface of the raceways and the rolling surface of the balls does not rise excessively, making it possible to prevent damage such as flaking, thus improving the durability of the bearing.

What is claimed is:

1. A double-row ball bearing of angular-type for a wheel in a vehicle comprising an inner ring having an outside surface around which first and second inner-ring raceways are formed in rows, an outer ring having an inside surface around which first and second outer-ring raceways are formed in rows, and a plurality of balls located rotatably between the first and second inner-ring raceways and the first and second outer-ring raceways, the balls having the same outer diameter, either of the inner and outer rings adapted to be supported by a suspension apparatus, and the other of the inner and outer rings adapted to support the wheel, (A) when installing the double-row ball bearing to the suspension apparatus, the first inner-ring raceway and the first outer-ring raceway are located on the widthwise outside of the vehicle, and the second inner-ring raceway and the second outer-ring raceway are located on the widthwise inside of the vehicle, then at least one of the following conditions, (a) and (b), must be satisfied, (a) the first inner-ring raceway has a first groove radius and the second inner-ring raceway has a second groove radius, such that the first groove radius of the first inner-ring raceway is larger than the second groove radius of the second inner-ring raceway, (b) the first outer-ring raceway has a third groove radius and the second outer-ring raceway has a fourth groove radius such that the third groove radius of the first outer-ring raceway is larger than the fourth groove radius of the second outer-ring raceway, (B) provided that the outside diameter of the balls is taken to be d, then the second groove radius of the second inner-ring raceway is 0.51d to 0.53d, the first groove radius of the first inner-ring raceway is 0.51d to 0.56d, the fourth groove radius of the second outer-ring raceway is 0.515d to 0.545d, and the third groove radius of the first outer-ring raceway is 0.53d to 0.565d, (C) the first groove radius of the first inner-ring raceway is not less than the second groove radius of the second inner-ring raceway, and the third groove radius of the first outer-ring raceway is not less than the fourth groove radius of the second outer-ring raceway.

* * * * *